June 13, 1967 L. E. PALMER ETAL 3,324,985

ENCODER

Filed Jan. 14, 1966

INVENTORS.
LEON E. PALMER
JOHN O. SCHAEFER
RICHARD J. YOUNG

BY E. Ronald Coffman
ATTORNEY.

3,324,985
ENCODER

Leon E. Palmer, John O. Schaefer, and Richard J. Young, Lexington, Ky., assignors to International Business Machines Corporation, Armonk, N.Y., a corporation of New York Filed Jan. 14, 1966, Ser. No. 520,775
7 Claims. (Cl. 197—16)

This encoder is characterized by the versatility it permits in the selection of codes, the amount of data encoded, and the use of prefix codes while maintaining a reasonably low space and economic cost.

Code generating keyboards are employed to enter data into various mechanisms, such as typewriters, teletypewriter communication systems, computers, and tape perforators. For some purposes, such as an office typewriter, the code generated in response to finger action can be as simple as an arbitrary permutative representation of a character. For calculating purposes the code can be of arithmetic significance as in the case of a binary code representation of a decimal number. In complex systems, such as a proportional escapement typewriter, the code can be of multiple significance, such as arbitrary character representation plus some value data indicative of the spacing required for printing the character.

Historically, typewriters and similar printers have employed a shift device for increasing their character capacity. The use of a shift device permits two or more characters to be printed through the operation of the same basic mechanism; the distinction between the characters being made by the shift device which acts in parallel with the basic selecting mechanism to vary its data significance. Encoding mechanism directed solely to such printers can take advantage of the identity of the character selection mechanism combined with a shift device by employing functionally related codes for related characters and employing a prefix code to operate the shift device. The Bedot teletypewriter code is an example of this practice.

Where coded data is required to be more than simply an arbitrary representation of a character for a use by a single mechanism, it sometimes is cumbersome to maintain an artifical functional relationship between shift distinguished codes. Ideally, in complex systems it is preferable to have complete freedom to base the assignment of codes on factors other than printer convenience. For example, it may be desired to assign value or arithmetic based codes to "Numbers" keys, which traditionally have symbols as their case shift counterparts. In such instances it may be desired to have the symbol counterparts assigned completely unrelate codes to avoid confusion with the value significance of the "Numbers" codes. Where a proportional escapement printer is employed, it is ordinarily required that upper case letters be allotted greater spacing than their lower case counterparts, and accordingly spacing data encoded for a lower case character must differ from that for its upper case counterpart. This invention provides encoding mechanism that is completely free of any requirement for an artifical relationship between character codes.

Accordingly, it has been an object of this invention to provide keyboard encoding mechanism that is not limited to any machine dictated relationship between individual codes.

A more specific object of this invention has been to provide an encoder for a keyboard having a shift mechanism that requires no relationship whatsoever between codes of upper and lower shift counterparts of any keybutton.

One phase or concept of this invention relates to the use of slide encoding mechanism of the type basically shown in U.S. Patent 2,987,086, entitled "Key Operated Machines," issued to J. E. Hickerson, Apr. 4, 1961, wherein a plurality of mutually superimposed slides are controlled to move permutably by key operated probes. The probes cooperate with code-producing, long and short openings formed in the slides.

Our invention employs a bi-directional probe member that cooperates with either of two different groups of encoding openings in a single set of slides to produce different coded outputs from a single key lever. The choice of which coded output to be generated is made by a shift mechanism which, for example, distinguishes between upper and lower case counterparts of a single key lever. Since different encoding openings are provided in the set of slides, there is no requirement whatsoever for any relationship between the upper and lower case counterpart codes of a single key button and the encoder can be as versatile as required for the job to be performed.

These and other objects, features, and advantages of this invention will be more fully understood and appreciated by those skilled in the art in the following description of a specific illustrative embodiment wherein reference is made to the accompanying drawings, of which:

Figures 1, 3:
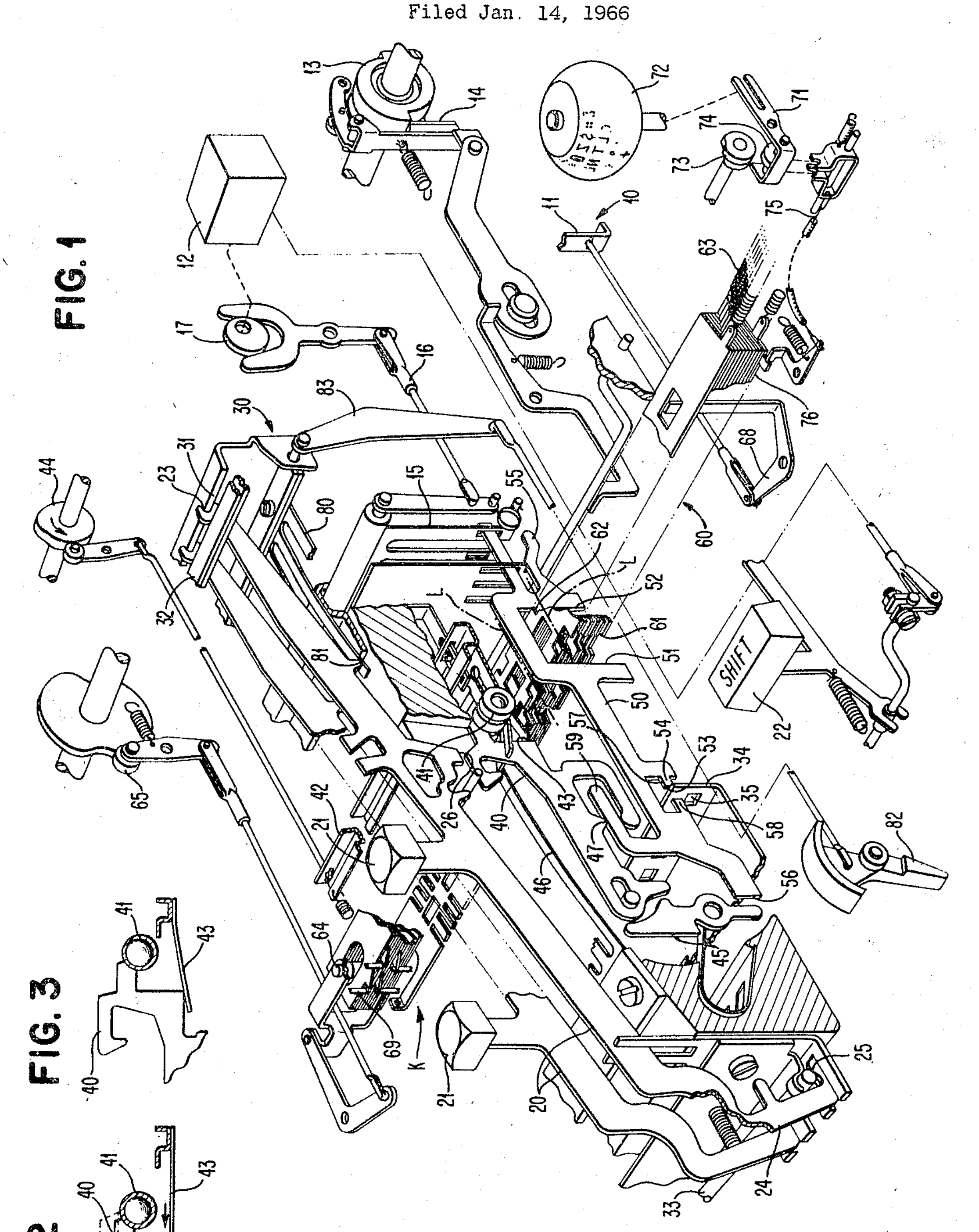
FIGURE 1 is a partially exploded perspective view of a keyboard constructed in accordance with this invention wherein duplicated parts are omitted for the sake of clarity.
FIGURE 2 and FIGURE 3 are operational views of a sequence discriminating mechanism shown in FIGURE 1.
Figure 2:
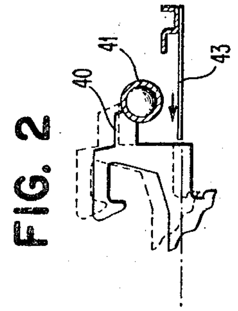

Referring now specifically to FIGURE 1, a keyboard encoder K is schematically shown as controlling cyclically operable data utilization mechanism such as typewriter character selecting mechanism 10 like that fully shown and described in U.S. Patent 2,919,002, entitled "Selection Mechanism for a Single Printing Element Typewriter," issued to L. E. Palmer, Dec. 29, 1959. The character selecting function or output of the printer is controlled by character selecting latches 11 and printer shift mechanism 12. The operating cycle of the printer is generated by a one revolution clutch 13 that is controlled by a positively restored clutch latch mechanism 14.

The keyboard encoder K includes a plurality of normally non-operative key levers 20 for controlling character print and operational functions, and having finger pads or buttons 21 thereon and arranged in a plurality of rows as is common with stenographic typewriters. The keyboard encoder K also includes a shift key 22 for controlling operation of the shift mechanism 12. The key levers 20 are pivotally mounted at their rear ends by a C-slot portion 23 that spans a flange edge 31 of the typewriter stationary frame structure 30. The key levers are loosely held in place by a removable retaining bar 32 that limits forward sliding movement of the C-slot portion 23. The other end of each key lever includes a downwardly turned leg portion 24 which terminates in a hook 25 which is engaged by a frame mounted retaining bar 33 to limit upward movement of the key lever 20. It will be appreciated that key levers 20 are each readily removable for modifications, substitution, or repair, simply by removal of retaining bars 32 and 33.

Each keylever 20, when depressed to its operative position, moves a sequence discriminating and actuating interposer or control link 40 by a primary dobber 26 to actuate an associated one of a plurality of laterally aligned probe members 50 to an active position wherein it inhibits the cyclic movement of selected slides 60 as determined by coded or open portion slots 61 and 62 therein. The character selecting latches 11 are thus moved by associated slides 60 according to the coding of the slides 60 at the location L of the activated probe member 50.

Attention is called to U.S. patent application Ser. No. 520,774, filed simultaneously herewith by John O. Schaefer, entitled "Keyboard Sequence Discriminator," which discloses and claims the particular mechanism by which fast sequentially operated control links 40 are filtered to prevent misoperation of the encoder. The mechanism principally employs a ball interlock mechanism 41 of well-known construction which cooperates with the control link 40 permitting only one control link to be carried therewithin at any one time. A cyclically operable reciprocating bail 42 carrying restore leaf spring force transfer members 43 is operated by a cam 44 to move an associated control link 40 out of the ball interlock 41 very early in a print cycle to permit the insertion of a second control link thereinto. The encoding slides 60 also move early in the cycle and prevent complete operation of the probe 50 associated with the second control link 40 until the slides 60 again become receptive near the end of the print cycle selected by the first depressed key.

*Encoding mechanism*

As briefly described above, the encoding mechanism comprises a plurality of mutually superimposed elongated slides 60 extending laterally past the group of probe members 50. Code portions in the form of variable length open-ended slots or open portions 61 and 62 positioned at spaced probing locations L are formed along opposed edges of the slides 60. The slides 60 are each yieldably biased by springs 63 to move in one direction, and are held in the other direction normally by a slide control mechanism 64 which is cyclically operated by a cam and follower mechanism 65 driven during each print cycle.

The coded slot portions 61 and 62 cooperate with respective ones of two probing edges 51 or 52 of each probe member 50 to permit or prevent movement of their associated slides, as determined by the length or nature of the individually probed slots. For example, a short slot 61 when engaged by a probing edge 51 at a probing location L will inhibit motion of the slide 60 of which it is a part, whereas a slide having a long slot 61 at the probing location L will not be so inhibited by the associated probing edge. The slots 61 and 62 are thus preconstructed to cooperate with probes corresponding to individual characters as represented by individual probing edges 51 and 52, and any desired code can be assigned to any individual probing edge. Of particular importance is the fact that separate probing edges 51 and 52 are provided for each key lever 20, thus permitting a dual significant or different coded output if desired from the key lever 20, depending upon operative selective of one of the associated probing edges 51 and 52.

Selection between the active probe member positions represented by engagement of edges 51 or 52 in slots 61 and 62, is conveniently controlled by the status of the shift mechanism 12 which distinguishes printer output between upper and lower case. The probe 50 is biased in either of two directions by a leaf spring 15 as selected by a shift status indicative linkage 16.

Selective motion of the slides 60, as controlled by a selected probing edge 51 or 52 and the associated slots 61 and 62, thus provides an encoded mechanical representation of the character selected by the keyboard. This representation can be used to control the character selection output of the printer as shown by motion transfer linkages 68 which operate the latches 11 of a selecting mechanism like that shown in the aforementioned U.S. Patent No. 2,919,002. An additional or alternative output from the slides 60 can be provided by individual code switches 69 operated by the slides in a manner like that disclosed in the above mentioned U.S. Patent 2,978,086. Inasmuch as the probing action of probe edges 51 and 52 is simultaneous relative to all of the slides 60, there is no time limitation imposed by the number of slides employed. Accordingly, this keyboard is capable of generating independent code representations of the same character as may be required, for example, to simultaneously control a printer according to one coded representation by one set of slides 60 and to generate an electrical representation according to a standard transmission code by a second set of slides 60. In such a mechanism, the slides for controlling the printer would have latch operating mechanical outputs like 68 herein and the transmitting control slides would have electrical outputs 69.

*Operation*

The operation of the encoding mechanism is as follows: the mechanism is in one or the other of its case shift states as controlled by the shift key 22 and continuously indicated by a cam 17 connected to the shift mechanism 12. The shift state of the printer, as transmitted through linkage 16, will cause the springs 15 to bias all of the probe members 50, either to the left or to the right. For purposes of explanation, let it first be assumed that the printer is in upper case, in which event the springs 15 will urge the probe members 50 to the left of FIGURE 1. The probe members 50 are normally held in an inactive position by engagement between latch-inactive edges 53 of latching fingers 54 and a latching bracket 34. Depression of a key button 21 operates a control link 40 and forces the probe member 50 downwardly. The latch-inactive edge 53 of the finger 54 becomes aligned with a hole 35 in the bracket 34 and the probe member 50 is then activated by movement to the left under the influence of spring 15. The probing edge 52 of the activated probe member enters an associated group of open-ended slots 62 in the stack of code slides 60, and also causes the camming surface of a bail actuator part 55 to depress a cycle clutch control bail 18 and release the cycle clutch latch 14 causing initiation of the printer cycle.

The foregoing actions have occurred substantially simultaneously since they are controlled solely by finger action and the spring 15. Immediately upon cycle initiation by release of latch 14, restore cam 44 operates to permit the leaf springs 43 to drive the control link 40 out of the ball interlock 41 as described above, allowing a second key lever to be depressed if desired. Early in the cycle the cam follower mechanism 65 permits the slide control mechanism 64 to move to the right in FIGURE 1, thus freeing the individual slides 60 for movement to the right under the influence of their associated springs 63. Those slides 60 having long slots 62 at the location L of the selected probing edge 52 will move to the right uninhibited by the probing edge, whereas those slides 60 having short slots 62 at this location will be inhibited. The slides 60 which are permitted to move will pivot their associated transfer links 68 operating the character selection latches 11 and printing operation will occur substantially as described in the above-mentioned U.S. Patent No. 2,919,002.

At an appropriate later time in the print cycle, the cam and follower 65 will cause the slide control mechanism 64 to move to its restored position, returning all slides 60 to their initial position. Subsequent to this operation, the keyboard restore leaf springs 43 continue their movement under the control of cam 44. The control link 40 is displaced to the left taking up lost motion between it, a motion reversing link 45, and a tail 56 of the probe member 50. Continued motion by the restore springs 43 causes the probe member 50 to be driven to the right until a latch-active surface 57 is free of the spring 35 in bracket 34. The probe member 50 is thus free to move upwardly under the influence of leaf spring 46 and connection 47 between it and the control link 40.

When the encoder K is in lower case status, the springs 15 are caused by shift status indicative linkage 16 to urge the probe members 50 to the right of FIGURE 1. Accordingly, a probe member 50, when activated by release of its latching finger 58, moves its probing edge 51 into slots 61 at the selected location L. During restore movement of the control link 40, it engages an arm 59 of the probe member 50 and moves the probe member 50 to the left until the latch finger 58 is disengaged from the bracket 34.

*Ancillary functions*

More sophisticated mechanisms often require various functions that are ancillary to a character print selection. One such ancillary function is print impact variation. Characters having a small cross-sectional area will penetrate the paper if the impact force required to print acceptable large characters is uniformly employed. A mechanism for varying the printing force or velocity is shown in FIGURE 1 and is similar in operation, but not control, to that described in U.S. Patent 3,239,049 of W. F. Voit, Jr., entitled "Impression Control Mechanism Automatically Selecting One of a Plurality of Cams." A drive arm 71 for a printhead 72 is driven in a printing movement about its axis by a plural surface cam 73 that energizes a follower roller 74. The roller 74 is slidably mounted to selectively engage any of the cam surfaces, thus permitting different rates of acceleration and print velocity. Roller 74 is slidably positioned by a cable 75 under the control of a slide 76 included along with the slides 60. The slide 76 is coded at locations L with long and short slots to cause impression control selection in the same manner as character selection. It will be recognized that other and more complex ancillary functions such as proportional escapement, and calculator entry, can be controlled similarly by the addition of appropriately coded slides.

*Touch control*

In any multirow keyboard the feel of various key buttons 21 tends to vary due to the difference in mechanical advantage provided by the distance of the key button from the various reaction force points. The principal forces involved in this keyboard are the spring 46, the frictional force between the latch fingers 54 and 58, and the latch bracket 34. All of these forces act through the dobber 26 of the key levers 20. To compensate for the varied mechanical advantage, trimming springs 80 are provided and engage a tab 81 of the key levers 20 which provides an initial deflection reaction and corresponding resilient force in the springs 80. The width of each spring 80 is selected by determining the desired feel-force increase between the stroke limits, considering the location of its associated keybutton. The initial feel-force or resistance is controlled by the length of tabs 81, again considering the location of its associated keybutton. An operator touch control lever 82 is also provided to vary the initial feel across the entire keyboard by pivoting the springs 80 as a group through crank arm 83. The touch control mechanism is held in any given position by suitable detent or friction means (not shown).

Those skilled in the art will appreciate that we have provided an encoding keyboard that achieves speed and versatility through the use of relatively simple mechanism. While some specific preferred embodiments of our invention have been disclosed for purposes of illustration, it is to be understood that various modifications of the disclosed mechanism can be made without departing from the scope and spirit of our invention as defined by the following claims.

We claim:

1. An encoder comprising:
   a plurality of substantially laterally aligned probe members, each having a normal inactive position and two different active positions,
   selective individual input means for differentially moving each probe member to one or the other of its active positions, a plurality of mutually superimposed elongated slides positioned adjacent said plurality of probe members and along the lateral extent thereof, each of said slides having two coded open portions at the location of each probe member therealong for receiving an associated probe member therein when moved to one of its active positions, said coded open portions being of either a first or second nature, the coded open portions of said first nature being of relatively short extent longitudinally of said slides and the coded open portions of said second nature being of relatively long extent longitudinally of said slides.

2. An encoder as defined in claim 1 wherein each of said probe members has a pair of opposed probing edges, one of said active positions existing when one of said probing edges is active and the other active position existing when the other of said probing edges is active, and said two coded open portions comprising open ended slots for receiving each of said pair of probing edges when said probe member is moved to its first and second active positions, respectively.

3. An encoder as defined in claim 2 further comprising cyclically operable yieldable means for tending to move said slides longitudinally after movement of a probe member to an active position.

4. An encoder as defined in claim 1 wherein said input means comprises a status data bias means operatively connected to each of said probe members towards one of said two different active positions, latch means normally retaining each of said probe members in its normal inactive position and dual significant data input means for individually selectively releasing said latch means of said probe members.

5. An encoder as defined in claim 4 wherein the data to be encoded originates in a keyboard having individual data keybuttons of dual significance and a shift key for individualizing operation of said data keybuttons, said shift key operatively controlling said status data bias means and said data keys operatively controlling said latch means.

6. An encoder as defined in claim 1 further comprising means operatively connected to said slides and responsive to the selective movement thereof for producing an output operation representative of the operation of said input means.

7. An encoder as defined in claim 6 further comprising one or more additional elongated slides mutually super imposed upon the plurality of slides and having coded open portions formed in opposed side edges thereof at the location of each probe member and means responsive to selective movement of said additional slides for controlling an output operation different from said first output operation.

References Cited

UNITED STATES PATENTS

| | | | |
|---|---|---|---|
| 1,974,307 | 9/1934 | Griffith | 178—17 |
| 1,988,943 | 1/1935 | Griffith | 178—17 |
| 2,559,637 | 7/1951 | Kirchel | 178—17 |
| 2,938,952 | 5/1960 | Roggenstein | 178—17 |
| 2,978,086 | 4/1961 | Hickerson | 197—16 |
| 3,037,606 | 6/1962 | Blain et al. | 197—1 |
| 3,135,371 | 6/1964 | Young | 197—16 |
| 3,239,049 | 3/1966 | Voit | 197—16 |

ROBERT E. PULFREY, *Primary Examiner.*

E. S. BURR, *Assistant Examiner.*